United States Patent [19]

Lindörfer et al.

[11] 4,427,528

[45] Jan. 24, 1984

[54] PROCESS FOR EXTRACTING CRUDE OIL FROM TAR SANDS

[76] Inventors: Walter Lindörfer, Christian-Beyer-Strasse 16, 3500 Kassel; Walther Schulz, Mozartstrasse 19, 2848 Vechta; Fritz Wagner, Hohe Wiese 2, 3301 Stöckheim; Wilhelm Jahn-Held, Schöne Aussicht 8, 3513 Staufenberg 1, all of Fed. Rep. of Germany

[21] Appl. No.: 231,139

[22] Filed: Feb. 3, 1981

[30] Foreign Application Priority Data

Feb. 4, 1980 [DE] Fed. Rep. of Germany ....... 3004003

[51] Int. Cl.$^3$ ................................................ C10G 1/04
[52] U.S. Cl. ............................ 208/11 LE; 208/8 LE
[58] Field of Search ............. 208/11 LE, 8 LE, 11 R

[56] References Cited

FOREIGN PATENT DOCUMENTS 2805823 8/1979 Fed. Rep. of Germany ... 208/11 LE
2928674 2/1981 Fed. Rep. of Germany ... 208/11 LE

*Primary Examiner*—Delbert E. Gantz
*Assistant Examiner*—A. Pal
*Attorney, Agent, or Firm*—Michael N. Meller

[57] ABSTRACT

A process for extracting crude oil from tar sands and clay-like materials. This is accomplished by adding a mixture of a trahalose lipid with water to the tar sands and subjecting the mixture to intensive agitation at 60°–90° C. to form a slurry and separating the slurry to recover a crude oil/water mixture.

10 Claims, No Drawings

PROCESS FOR EXTRACTING CRUDE OIL FROM TAR SANDS

INTRODUCTION

This invention relates to the extraction of crude oil. More particularly, it deals with the removal of such crude oil from tar sands and clay-like materials.

BACKGROUND OF THE INVENTION

The decrease in the world's supply of petroleum and the increasing need for energy to supply the constantly growing world population requires an increased production of this raw material by means of improving the technology of producing crude oil. As is well known, hydrocarbon sources include in addition to petroleum obtained from underground deposits, also crude oil which is contained and extracted from tar sands in surface and underground deposits, for example in Canada and Venezuela.

Such tar sands contain sand and clay as the major components in admixture with high viscosity crude oils and bitumen. These tar sands are dredged deposits attainable from the surface after removal of rubble and treated with hot water in large separation tanks. A foaming up of the crude oil occurs thereby, while the solid materials contained in the mixture settle on the bottom of the tank by means of gravity separation. The crude oil removed from the separation tank is separated by distillation into light and heavy fractions. The light fraction must for the most part be enriched by hydrogenation with hydrogen in order to obtain from this crude oil fraction a product which is similar to petroleum obtained in liquid form from oil wells.

Employing this procedure, separation of the crude oil and especially of the bituminous component from the clay is incomplete, so that the solid portion separated from the foamed crude oil is a clay-oil-bitumen slime, which hitherto has been stored in basins. In order to improve the separation during treatment of the tar sands with hot water at a temperature of 80° C., alkalis can be added to the water. The hydrophobic reactions between the components of the bitumen and the clay are reduced thereby. The alkalis form surface active salts with the acids contained in the bitumen and these facilitate the separation of the bitumen from the solid materials of the tar sand. Of course, compounds of this type seem to contribute to the formation of reactive clay slimes. Therefore organic solvents, such as gasoline or kerosene, have also been added during hot water treatment of the tar sands, in order to decrease the viscosity of the bitumen. Finally, it has been recommended that surface active substances, such as soap or non-ionic detergents be added together with the alkalis or alone to the hot water.

In order to open up the tar sand deposits which are not accessible above ground, it is known from "Oil Sands" (1977), pages 584 to 592, to inject steam into the deposits until the highly viscous crude oil of low mobility is converted by heating into a crude oil of low viscosity and good fluidity. To this end, hot water is injected into the deposits through injection bore holes at a temperature of 150° to 260° C. or steam is employed at temperatures of up to 315° C.

The extraction of crude oil by the heating of tar sand deposits can be carried out by the so-called cyclic steam stimulation method whereby steam is injected into tar sand deposits through a bore hole for a certain period of time, such as a month. Then the crude oil mixture is drawn out of the same bore hole until the tar sand deposit in the vicinity of the bore hole cools down so much that the crude oil no longer flows. This procedure can be repeated alternately until no more crude oil can be obtained from the tar sand deposit.

According to another known process, the drawing out of the crude oil heated by steam from underground tar sand deposits can be carried out through the discharge bore holes which have been made lower in tar sand deposits in addition to injection bore holes. Here it has proved useful to have underground fissure connections between the injection bore hole and the one or more extraction bore holes produced by means of hydraulic shock or the introduction of steam under a pressure so high that this leads to the formation of fissures. In the latter case, a solution of caustic soda and surface active agents can additionally be injected into the tar sand deposits with the steam, in order to emulsify the crude oil in the steam condensate, as well as make it more capable of flowing. The removal of oil from the deposits according to this process, however, is still unsatisfactory.

In the publication of the Canadian Institute of Mining and Metallurgy (CIM) in "CIM Special Vol." 17 (1977), at pages 705 to 710, a scientific investigation of bitumen extraction from so-called tar sands with the aid of microbiological surface active agents is reported. As a result of these investigations, it was determined that surface active agents produced by a micro-organism of the Corynebacterium type are very effective in the separation of bitumen from sand and clay; in the flotation of the separated bitumen; as well as for the purification of the remaining sand as a residue. The concentration of the bitumen in the clumps of bitumen and sand contained in the residue is viewed as a measure of the effectiveness. The higher the concentration of the bitumen in these clumps, the more sand is washed out in purer form. If, by hot water treatment without the addition of detergents, the concentration of the bitumen amounts to 12 wt. %, it rises to 30.7 wt. % with the addition of 0.01 wt. % of a culture liquor of Corynebacterium in kerosene, while other synthetic surface active agents in a concentration of 0.02 wt. % only effect an increase of the bitumen concentration to 28.3 wt. %. Of the surface active agent contained in the culture liquor of the Corynebacterium, it is only known that it is a lipid. The unpurified surface active substance decreases the surface tension of water from 72.05 dyne/cm to only 51.4 dyne/cm in a concentration of 150 mg/l.

The German laid-open publication DE-OS 28 05 823 discloses a process for obtaining petroleum by flooding petroleum deposits with dispersions of non-ionic, surface active agents in water. According to this process, glycolipids of a certain structure are produced in the first step by hydrocarbon consuming microorganisms under aerobic conditions. These are separated in a second step from the cell mass by a temperature-, pH-, or osmotic shock, and the aqueous phase with the glycolipids dispersed therein is used directly as the flooding agent or added to the flood water or separated by extraction from the cell mass and added to the flood water.

From the foregoing, it is seen that a need exists for a truly effective process for the extraction of crude oil from tar sands employing steam or hot water.

OBJECTS AND SUMMARY OF THE INVENTION

It is therefore an object of the present invention to obtain crude oil (an oil not indentical to the crude petroleum from petroleum deposits, but more viscous and poorer in hydrogen than petroleum) from tar sands employing glycolipids.

It is a further object of the invention to obtain crude oil by forcing a mixture of trehalose lipids and hot water into tar-sand containing deposits while the crude oil-water mixture is drawn out through at least one production bore.

According to the invention, there is provided a process for obtaining crude oil from tar sands employing hot water and glycolipids as non-ionic, surface active materials and separating the crude oil from the resulting crude oil-water-solid mixture. Accordingly, trehalose lipids in the form of a dispersion in water or a solution in an organic, water miscible solvent is mixed with water having a temperature of 90° C. and this mixture is then mixed with the tar sand, whereafter the crude oil-water mixture is separated from this mixture.

The trehalose lipids used in the process of the invention can be obtained by the process which is described in German laid-open publication 28 05 823.

For the process of the invention, the trehalose lipids have the general formula

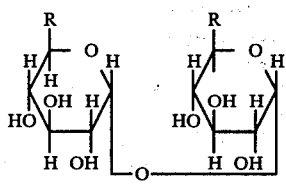

wherein R is a group of the general formula

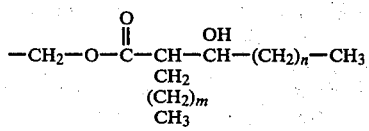

where m=8 to 10 and n=18 to 21 or a group of the general formula

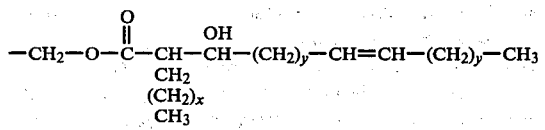

where x=8 to 10 and y=7 to 12.

In a concentration of 100 ml/l, these trehalose lipids lower the surface tension of water to 28 dyn/cm. The surface tension of such a trehalose lipid-water mixture toward crude oil lies between 0.1 and 3.7 dyn/cm.

In the use of the process of the invention for the extraction of crude oil from tar sand deposits, which cannot be opened on the surface, the mixture of trehalose lipid and water, preferably hot water, is injected into the tar sand containing crude oil through at least one injection bore hole and the crude oil-water mixture is drawn out of at least one production bore hole in the same deposit.

It is also possible to prepare a fissure connection beforehand between an injection bore hole and a production bore hole by hydraulic shock action or the like in a manner already known.

Whenever the instant process is employed for extracting crude oil from tar sands in surface areas, it has been shown to be advantageous, to intensively agitate the mixture of tar sand, trehalose lipid and water, preferably hot water, to a watery slurry, from which a crude oil-water mixture foams up after subsequent slow agitation or standing and is separated. The remaining solid material which consists of sand, clay and bitumen-oil clumps settles out and is separated from the liquid phase, or the bitumen-oil clumps isolated therefrom, are then advantageously treated once more with a mixture of trehalose lipid and water and held for some time at a temperature of up to 90° C. with the floating crude oil-water mixture therefrom separated. In many cases, it has been found convenient to dilute the solid mixture which has been made into a paste with trehalose lipid and water, with a further amount of trehalose lipid-water mixture, before the crude oil-water mixture is separated from the resulting mix. The bitumen-oil clumps can usefully be separated from the solid residue by means of gravity separation or floatation on the basis of the different densities of sand and clay.

Following the separation of the floating crude oil-water mixture on the one hand and the solid portion on the other from the watery slurry obtained by agitation of the mixture of trehalose lipid and water, preferably hot water, together with the tar sand or the once already extracted residue, there remains an aqueous phase, which can conveniently be added, if necessary after previous heating, for admixing with trehalose lipid dispersions or solution or for treatment of a further amount of tar sand.

For a quicker separation of the crude oil-water mixture into its components, oil splitting agents can be added which are known as such and have this property.

Finally the foaming up of the crude oil from the mixture of tar sand with the mixture of trehalose lipid and water can be accelerated by the introduction of air.

Instead of the solid mixture separated from the mixture of tar sand with the mixture of trehalose lipid and water or together therewith, a mud consisting of sand, clay and bitumen-oil clumps can be used in the above described process. This mud which accumulated as a worthless residue until now from the known hot water extraction of tar sands is obtained by mining and had to be stored in basins.

The trehalose lipids used according to the invention are advantageously dispersed in water in an amount of 0.1 to 1.0 g/l. They can also be added as a corresponding amount of culture filtrate. The trehalose lipids can also be mixed with the water dissolved in an organic solvent which preferably is miscible with water. In order to disperse the trehalose lipid in water, the mixture of these components must be intensively mixed, which, for example, can be effected by ultrasonic treatment. This trehalose lipid-containing water is then mixed with tar sand in a weight ratio of 3:2 and advantageously heated to a temperature below 90° C., preferably 65° to 75° C. After this mixture has been held for about 2 hours at that temperature, the oil phase which has risen to the top and which still contains water, is drawn off from the remaining mixture and employed for further processing. The solid materials which settle out under gravity separation from the remaining aqueous phase, are separated out as much as technically possible. The aqueous phase is then either used for the preparation of the trehalose lipid—water mixture or added to another amount of tar sand for treatment according to the invention. Additional crude oil may be obtained from the solids mixture extensively freed from the aqueous phase. The sand-clay-bitumen mixture remaining as a residue, is practically free of crude oil.

In accordance with the process of this invention, it is possible to obtain a practically complete separation of the crude oil from the tar sands and by use of a surface active agent, a bitumen constituent of special structure in only small concentration. Further, the surfactant-containing aqueous phase can be recycled several times.

EXAMPLES

The following examples merely serve to illustrate the invention in specific detail and when read in conjunction with the foregoing description will aid in determining the full scope of the present invention. The examples are merely illustrative and are not intended to restrict this invention. All parts, percentages and ratios set forth herein are by weight unless otherwise indicated.

EXAMPLE 1

(Comparison)

10 parts by weight of a clay-containing tar sand with a 9.1 wt. % bituminous crude oil content is intensively stirred with 15 parts by weight of water in a correspondingly large vessel and then held for 2 hours at a temperature of 75° C. with slow agitation. After a short period of standing 0.034 parts by weight of crude oil floats on the aqueous phase and is drawn off. The preponderant amount of the crude oil remains in the clay-containing oil sand remaining on the bottom.

EXAMPLE 2

(Comparison)

10 parts by weight of a clay-containing tar sand with a 9.1 wt. % bituminous crude oil content is intensively mixed with 15 parts by weight of an aqueous solution or emulsion of a known surfactant listed in the following table. To dissolve or emulsify these surfactants in water, both components are mixed and this mixture treated ultrasonically at a temperature of 20° C. for 5 min.

The intensive mixing of the tar sand with the aqueous surfactant solution or emulsion is obtained by slow agitation for 2 hours at a temperature of 75° C. After standing for a short time the stated amounts of crude oil rose to the surface of the aqueous phase and were drawn off. In each case significant amounts of crude oil remained in the clay containing sand which sank to the bottom.

| Experiment | Surfactant | Concentration of the Surfactant in H$_2$O mg/l | Liberated Crude Oil Parts by Weight |
|---|---|---|---|
| A | Surfactant 1 | 500 | 0.043 |
| B | Surfactant 2 | 500 | 0.031 |
| C | Surfactant 3 | 500 | 0.062 |
| D | Surfactant 3 | 5000 | 0.090 |
| E | Surfactant 4 | 500 | 0.052 |

-continued

| Experiment | Surfactant | Concentration of the Surfactant in H$_2$O mg/l | Liberated Crude Oil Parts by Weight |
|---|---|---|---|
| F | Surfactant 4 | 5000 | 0.082 |

(1) Surfactant 1 = oleic acid ethoxylate
(2) Surfactant 2 = polyoxyethylene
(3) Surfactant 3 = Saccharose-fatty acid ester with 50% mono- and 50% di- and triester
(4) Surfactant 4 = Saccharose-fatty acid ester with 70% mono- and 30% di- and triester.

EXAMPLE 3

10 parts by weight of the clay containing tar sand according to Example 1 were intensively mixed with 15 parts by weight of an aqueous dispersion of a trehalose lipid, which was obtained by ultrasonic treatment according to Example 2. This mixture was held for two hours at a temperature of 75° C. After a short period of standing, the amount of crude oil stated in the table rises from the mixture and is drawn off from the aqueous phase.

| Experiment | Concentration of the Trehalose lipid in H$_2$O mg/l | Liberated Crude Oil Parts by Weight |
|---|---|---|
| G | 277.7 | 0.207 |
| H | 500 | 0.276 |
| I | 620 | 0.386 |

EXAMPLE 4

The precipitated solid component was separated from the mixture residue remaining in Experiment I (Example 3) after drawing off the floating crude oil. The aqueous phase remaining was intensively mixed with 10 parts by weight of tar sand. After slow agitation the mixture was held for 2 hours at a temperature of 75° C. After a short period of standing, 0.32 parts by weight of crude oil floated from the mixture and was drawn off.

EXAMPLE 5

The bitumen-oil clumps which had settled out with the solid material after drawing off the crude oil in Example 4 were isolated from the remaining residue mixture and intensively mixed with 5 parts by weight of an aqueous dispersion of 600 mg/l trehalose lipid. The mixture was then held for 2 hours at a temperature of 89° C. under slow agitation. After a short period of standing, 0.135 parts by weight of crude oil floated up from the aqueous phase and was drawn off.

The foregoing description of the invention has been presented describing certain operable and preferred embodiments. It is not intended that the invention should be so limited since variations and modifications thereof will be obvious to those skilled in the art, all of which are within the spirit and scope of this invention.

What is claimed is:

1. Process for extracting very viscous crude oil from bitumen-containing originally untreated tar sands comprising the steps of:
   (a) admixing a trehalose lipid with water at a temperature from 65° to 90° C.;
   (b) adding the mixture from step (a) to the tar sands with intensive agitation to form a slurry; and
   (c) separating from the slurry of step (b)/to/a crude-oil/water mixture, containing about ⅓ of the content of said viscous crude oil from the tar sands.

2. The process of claim 1, wherein the trehalose lipids are in the form of a dispersion.

3. The process of claim 1, wherein the trehalose lipids are in organic-water miscible solvent solution.

4. The process of claim 1, wherein the solid mixture which has been treated with trehalose lipid and water is diluted with a further amount of trehalose lipid-water mixture before the crude oil-water mixture is separated from the resulting mixture.

5. The process of claim 1, wherein the aqueous phase separated from the solid portion is reused as the water for mixing with the trehalose lipid dispersion or solution or for treatment of a further amount of tar sands.

6. The process of claim 1, wherein the addition of the trehalose lipid dispersion of solution in water is carried out in one or more steps, directly or indirectly.

7. The process of claim 1, wherein the foaming up and separation of the crude oil from the crude oil-water mixture is enhanced by the introduction of air.

8. The process of claim 1, wherein the temperature in step (a) is from 65° to 75° C.

9. Process for extracting very viscous crude oil from bitumen-containing originally untreated tar sands comprising the steps of:
 (a) admixing a trehalose lipid with water at a temperature from 65° to 90° C.;
 (b) adding the mixture from step (a) to the tar sands with intensive agitation to form a slurry;
 (c) separating from the slurry of step (b) a crude-oil/water mixture containing about ⅓ of the content of said viscous crude oil, from solids consisting essentially of sand, clay, bitumen-oil clumps and isolated bitumen-oil clumps;
 (d) treating the solids separated in step (c) with a second mixutre of trehalose lipid and water at a temperature from 65° to 90° C.; and
 (e) separating a second crude-oil/water mixture containing again about ⅓ of the content of said viscous crude oil from the solids.

10. Process for extracting very viscous crude oil from bitumen-containing originally untreated tar sands comprising the steps of:
 (a) admixing a trehalose lipid with water at a temperature from 65° to 90° C.;
 (b) adding the mixture from step (a) to the tar sands with intensive agitation to form a slurry;
 (c) separating from the slurry of step (b) a crude-oil/water mixture containing about ⅓ of the content of said viscous crude oil, from solids consisting essentially of sand, clay, bitumen-oil clumps and isolated bitumen-oil clumps;
 (d) treating the solids separated in step (c) with a second mixture of trehalose lipid and water at a temperature from 65° to 90° C.;
 (e) separating a second crude-oil/water mixture containing again about ⅓ of the content of said viscous crude oil from the solids;
 (f) treating the solids separated in step (e) with a third mixture of trehalose lipid and water at a temperature from 65° to 90° C.; and
 (g) separating a third crude-oil/water mixture resulting in a removal of up to 92% of the viscous crude oil from the originally untreated tar sands.

* * * * *